(12) United States Patent
Rohrmann

(10) Patent No.: US 6,429,250 B1
(45) Date of Patent: Aug. 6, 2002

(54) TALC-REINFORCED POLYPROPYLENE MOLDING COMPOSITION WITH HIGH IMPACT STRENGTH

(75) Inventor: Jürgen Rohrmann, Kelkheim (DE)

(73) Assignee: Targor GmbH, Mainz (DE)

( * ) Notice: Subject to any disclaimer, the term of this patent is extended or adjusted under 35 U.S.C. 154(b) by 0 days.

(21) Appl. No.: 09/455,485

(22) Filed: Dec. 6, 1999

(30) Foreign Application Priority Data

Dec. 11, 1998 (DE) .......................... 198 57 292

(51) Int. Cl.⁷ .............................. C08K 3/36; C08L 23/04
(52) U.S. Cl. ...................... 524/451; 524/515; 525/240
(58) Field of Search ..................... 515/240; 529/451, 529/515

(56) References Cited

U.S. PATENT DOCUMENTS

| | | | |
|---|---|---|---|
| 4,705,818 A | 11/1987 | Kawai et al. ................ | 523/200 |
| 4,857,613 A | 8/1989 | Zolk et al. .................. | 526/128 |
| 5,288,824 A | 2/1994 | Kerth et al. ................. | 526/128 |
| 5,763,534 A | * 6/1998 | Srinivasan et al. .......... | 525/240 |

FOREIGN PATENT DOCUMENTS

| | | |
|---|---|---|
| DE | 3319619 | 12/1983 |
| EP | 009276 | 4/1980 |
| EP | 045975 | 2/1982 |
| EP | 045977 | 2/1982 |
| EP | 086473 | 8/1983 |
| EP | 323716 | 7/1989 |
| EP | 430490 | 6/1991 |
| EP | 476625 | 3/1992 |
| EP | 5095662 | 3/1992 |
| EP | 496926 | 7/1992 |
| EP | 519725 | 12/1992 |
| EP | 692499 | 1/1996 |
| EP | 790076 | 8/1997 |
| EP | 844281 | 11/1997 |

OTHER PUBLICATIONS

*Kunststoffe*, 84, 1994, 446–450.

* cited by examiner

*Primary Examiner*—David W. Wu
*Assistant Examiner*—R. Harlan
(74) *Attorney, Agent, or Firm*—Keil & Weinkauf

(57) ABSTRACT

A talc-reinforced polypropylene molding composition with high impact strength comprising a) from 35 to 90% by weight of a propylene polymer (A) with a melt flow rate of from 15 to 100 g/10 min at 230° C. and under a load of 2.16 kg in accordance with ISO 1133 and a content of from 0 to 25% by weight of other $C_2$–$C_{10}$ 1-alkenes, b) from 5 to 40% by weight of an ethylene polymer (B) with from 20 to 30% by weight of copolymerized $C_4$–$C_{10}$ 1-alkenes, a melt flow rate of from 0.2 to 30 g/10 min at 190° C. and under a load of 2.16 kg in accordance with ISO 1133, a density of from 0.850 to 0.880 g/cm³ and a Mooney viscosity (MS 1+4; 121° C.) of from 5 to 50 in accordance with DIN 53523/T1, and c) from 5 to 25% by weight of talc whose average particle size by the Sedigraph method is from 1.0 to 10 $\mu$m.

7 Claims, No Drawings

TALC-REINFORCED POLYPROPYLENE MOLDING COMPOSITION WITH HIGH IMPACT STRENGTH

The present invention relates to a talc-reinforced polypropylene molding composition with high impact strength, comprising a) from 35 to 90% by weight of a propylene polymer (A) with a melt flow rate of from 15 to 100 g/10 min at 230° C. and under a load of 2.16 kg in accordance with ISO 1133 and a content of from 0 to 25% by weight of other $C_2$–$C_{10}$ 1-alkenes, b) from 5 to 40% by weight of an ethylene polymer (B) with from 20 to 30% by weight of copolymerized $C_4$–$C_{10}$ 1-alkenes, a melt flow rate of from 0.2 to 30 g/10 min at 190° C. and under a load of 2.16 kg in accordance with ISO 1133, a density of from 0.850 to 0.880 g/cm$^3$ and a Mooney viscosity (ML 1+4; 121° C.) of from 5 to 50 in accordance with DIN 53523/T1, and c) from 5 to 25% by weight of talc whose average particle size by the Sedigraph method is from 1.0 to 10 μm.

The present invention further relates to a process for producing talc-reinforced polypropylene compositions of this type, and also to their use as films, fibers or moldings, in particular in the automotive sector.

Blends, i.e. mixtures of high-impact-strength polypropylene with other polyolefins, have for more than 20 years been the most important class of materials for producing automobile bumpers and dashboards. Whereas at the start of this development the blends used were mainly made from polypropylene and ethylene-propylene rubbers produced in extruders, 10 years later the blends used included in particular those obtained from a reactor cascade. For these a polypropylene is first prepared in a first reactor, and ethylene and propylene are then polymerized onto this once it has been transferred into the second reactor. The polymerization usually takes place with the aid of Ziegler-Natta catalysts, as described, for example, in EP-A 45975, U.S. Pat. No. 4,857,613 or U.S. Pat. No. 5,288,824.

For some years there has also been increasing use of mineral-reinforced blends made from polypropylene with ethylene-propylene rubbers, and particular attention has been given to talc-reinforced blends (EP-A 9276, EP-A 430490, EP-A 476926, DE-A 3319619). Talc-reinforced blends of this type have, inter alia, low linear expansion and are therefore very suitable for jointless connections (zero-gap), for example of a bumper to the bodywork. They also feature, inter alia, high stiffness.

EP-A 519725 describes a highly crystalline polyolefin material suitable for producing automotive bumpers. This material is prepared by blending in an extruder and is composed of the following four components: an ethylene-propylene rubber, an ethylene-propylene block copolymer, an ethylene-butene copolymer and from 3 to 10% by weight of talc. The preparation of this complicated mixture in an extruder is very laborious and results in inhomogeneity. The mechanical properties of this mixture do not meet the latest technical requirements and the talc reinforcement makes the density of the material too high for many applications.

EP-A 496625 also discloses a highly crystalline polyolefin material suitable for producing automotive bumpers. For this, still higher stiffness is achieved by adding up to 30% by weight of talc. These materials, too, are characterized by densities of more than 1.05 kg/cm$^3$, too high for many applications.

For weight-saving it is advantageous for moldings such as bumpers to have thin walls. However, if a large-surface-area bumper with thin walls is to be produced by injection molding, the material used must be very free-flowing as well as meeting the usual requirements for high stiffness, adequate low-temperature impact strength and low linear expansion. In addition, the cost of the material must be low. This is not achievable with currently known polypropylene blends since the flowability (melt flow rate) of known bumper materials in accordance with ISO 1133 is only in the range from 2.5 to 9 g/10 min at 230° C. and 2.16 kg.

However, the increase in the melt flow rate of polypropylene blends which would be needed to produce thin-walled moldings is associated with loss of impact strength at low temperatures. Furthermore, substantial viscosity differences mean that blends of free-flowing polypropylene with ethylene-propylene rubber have very poor dispersion, as well as poor impact strength at low temperatures. If organic peroxides are used for chemical degradation of polypropylene blends of this type in order to increase flowability the result is a drastic deterioration in impact strength and stiffness. Reinforcement of blends of this type using talc, furthermore, reduces ultimate elongation as well as flowability.

It is an object of the present invention to overcome the disadvantages described and to develop a polypropylene molding composition which, due to its melt flow rate of at least 10 g/10 min at 230° C. and 2.16 kg in accordance with ISO 1133, is suitable for producing relatively thin-walled moldings and has low linear expansion and high ultimate elongation as well as good stiffness and impact strength at low temperatures. A further object is to find a very simple and cost-effective process for preparing polypropylene molding compositions of this type.

We have found that this object is achieved by means of the novel polypropylene molding composition defined at the outset.

The novel talc-reinforced polypropylene molding composition is composed of a) from 35 to 90% by weight of a propylene polymer (A) with a melt flow rate of from 15 to 100 g/10 min at 230° C. and under a load of 2.16 kg in accordance with ISO 1133 and a content of from 0 to 25% by weight of other $C_2$–$C_{10}$ 1-alkenes, b) from 5 to 40% by weight of an ethylene polymer (B) with from 20 to 30% by weight of copolymerized $C_4$–$C_{10}$ 1-alkenes, a melt flow rate of from 0.2 to 30 g/10 min at 190° C. and under a load of 2.16 kg in accordance with ISO 1133, a density of from 0.850 to 0.880 g/cm$^3$ and a Mooney viscosity (ML 1+4; 121° C.) of from 5 to 50 in accordance with DIN 53523/T1, and c) from 5 to 25% by weight of talc whose average particle size by the Sedigraph method is from 1.0 to 10 μm.

The total here of the individual components (A), (B) and (C) is always 100% by weight.

Particularly preferred talc-reinforced polypropylene molding compositions comprise a) from 40 to 70% by weight, in particular from 45 to 65% by weight, of a propylene polymer (A), b) from 15 to 35% by weight, in particular from 15 to 33% by weight, of an ethylene polymer (B), and c) from 10 to 25% by weight, in particular from 10 to 22% by weight, of talc (C), where the total of the individual components (A), (B) and (C) is again always 100% by weight.

The melt flow rate of the novel talc-reinforced polypropylene molding composition in accordance with ISO 1133, at 230° C. and under a load of 2.16 kg, is preferably from 10 to 40 g/10 min, in particular from 15 to 25 g/10 min and particularly preferably from 15 to 20 g/10 min. The melt flow rate may also be adjusted by chemical degradation during the preparation process of the novel polypropylene molding composition, with the aid of peroxides.

The novel talc-reinforced polypropylene molding composition comprises, inter alia, the propylene polymer (A), which has a melt flow rate in accordance with ISO 1133, at 230° C. and under a load of 2.16 kg, of from 15 to 100 g/10 min, in particular from 30 to 60 g/10 min, and a content of from 0 to 25% by weight, in particular from 5 to 10% by weight, of other $C_2$–$C_{10}$ 1-alkenes.

For the purposes of the present invention, $C_2$–$C_{10}$ 1-alkenes include in particular $C_4$–$C_{10}$-1-alkenes, such as 1-butene, 1-pentene, 1-hexene, 1-heptene and 1-octene, as well as ethylene. Preference is given to the use of ethylene or 1-butene. It is also possible to use mixtures of two different $C_2$–$C_{10}$ 1-alkenes, for example of ethylene and 1-butene. The $C_2$–$C_{10}$ 1-alkene used in the propylene polymer (A) comprises in particular ethylene.

The propylene polymer (A) may therefore be either a propylene homopolymer or a propylene copolymer with up to 25% by weight of other copolymerized $C_2$–$C_{10}$ 1-alkenes. The propylene polymer (A) used may also be a propylene block copolymer made from 1.0 to 99% by weight, in particular from 30 to 90% by weight, of a propylene homopolymer and from 1.0 to 99% by weight, in particular from 10 to 70% by weight, of a propylene copolymer with from 5 to 70% by weight, in particular from 7 to 50% by weight, of other copolymerized $C_2$–$C_{10}$ 1-alkenes.

Propylene polymers (A) of this type are either available commercially or can be prepared by known processes.

The process giving these propylene polymers (A) can be carried out in the reactors usually used for polymerizing 1-alkenes, either batchwise or preferably continuously, inter alia in solution, as a suspension polymerization or as a gas-phase polymerization. Examples of suitable agitated reactors are continuous stirred tank reactors, loop reactors and fluidized-bed reactors. The reaction may, of course, also be carried out in a series of two or more reactors arranged in series. The polymerization is preferably carried out in the gas phase or in a suspension (bulk polymerization). Suitable gas-phase reactors here are fluidized-bed reactors, and also horizontally or vertically agitated powder-bed reactors. Powder-bed reactors used are particularly those in which the reaction bed is maintained in motion by vertical agitators. The reaction bed is generally composed of the polymer produced in the particular reactor. Examples of suitable suspension reactors are loop reactors.

The polymerization of the propylene polymers (A) to be used according to the invention is preferably carried out at from 30 to 150° C., in particular from 40 to 100° C., and at pressures of from 10 to 100 bar, in particular from 15 to 80 bar, in the presence of a Ziegler-Natta catalyst system comprising, a) a titanium-containing solid component which has at least one halogen-containing magnesium compound and an electron donor, b) an aluminum compound, and c) another electron-donor compound.

A preferred titanium-containing solid component is prepared from, inter alia, titanium tetrachloride, diisobutyl phthalate, ethanol and magnesium dichloride. Its composition and preparation are known, for example, from EP-A 45975, EP-A 45977 or EP-A 86473.

The titanium-containing solid component may also comprise, alongside the components described above, a support, for example an inorganic oxide, such as silica gel. The resultant Ziegler-Natta catalyst systems are known, for example, from U.S. Pat No. 4,857,613 or U.S. Pat. No. 5,288,824.

The propylene polymers (A) to be used according to the invention may moreover be obtained by polymerization at from –50 to 300° C., in particular from 0 to 150° C. and at pressures of from 0.5 to 3000 bar, in particular from 1 to 100 bar with the aid of metallocene catalyst systems. These may comprise A) if desired an inorganic or organic support, B) at least one metallocene complex, C) at least one metallocenium-ion-forming compound, and D) if desired at least one organic metal compound of an alkali metal or of an alkaline-earth metal or of a metal of the 3rd main group of the Periodic Table.

Metallocene catalyst systems of this type are described, for example, in EP-A 692499, EP-A 323716 or EP-A 790076.

The propylene polymer (A) may also, following its preparation, be subjected to a controlled chemical molar-mass degradation process using organic peroxides at from 180 to 280° C., in particular from 180 to 240° C., in a suitable mixer, for example in an extruder.

The novel talc-reinforced polypropylene molding composition also comprises, inter alia, an ethylene polymer (B) with from 20 to 30% by weight of copolymerized $C_4$–$C_{10}$ 1-alkenes, a melt flow rate of from 0.2 to 30 g/10 min at 190° C. and under a load of 2.16 kg in accordance with ISO 1133, a density of from 0.850 to 0.880 g/cm³ and a Mooney viscosity (ML 1+4; 121° C.) of from 5 to 50 in accordance with DIN 53523/T1.

A preferred ethylene polymer (B) has from 23 to 26% by weight of copolymerized $C_4$–$C_{10}$ 1-alkenes, a melt flow rate of from 0.5 to 5 g/10 min at 190° C. and under a load of 2.16 kg in accordance with ISO 1133, a density of from 0.855 to 0.870 g/cm³ and a Mooney viscosity (ML 1+4; 121° C.) of from 20 to 40, in particular 15 to 35, in accordance with DIN 53523/T1.

For the purposes of the present invention, the term $C_4$–$C_{10}$ 1-alkenes includes, besides 1-butene, in particular 1-pentene, 1-hexene, 1-heptene and 1-octene, particularly preferably 1-octene.

Ethylene polymers (B) of this type are obtainable, for example, by polymerizing ethylene with the aid of conventional Ziegler catalysts or Phillips catalysts, for example in the gas phase, in a solution or in a suspension. The ethylene polymers (B) can also be prepared with the aid of metallocene catalysts. The polymerization to prepare the ethylene polymers (B) may be carried out either batchwise or continuously in agitated reactors, loop reactors or fluidized-bed reactors, preferably at from 10 to 120° C., in particular from 20 to 110° C., and at pressures of from 1.0 to 100 bar, in particular from 10 to 50 bar. The ethylene polymers (B) may, for example, be purchased in the plastics market.

To prepare the ethylene polymers (B) to be used according to the invention use is preferably made of metallocene catalysts based on single-site complexes. These comprise, as appropriate, an inorganic or organic support, at least one single-site complex, at least one metallocenium-ion-forming compound, and also other organic metal compounds as appropriate.

The propylene polymers (A) and ethylene polymers (B) to be used according to the invention may also comprise other additives, such as stabilizers, lubricants, mold-release agents, fillers, nucleating agents, antistats, plasticizers, dyes, pigments or flame retardants, the usual amounts of which are added prior to use. These are generally incorporated into the polymer during pelletization of the polymerization product produced in powder form (Kunststoffe, 84(1994), pp. 446–450).

Conventional stabilizers are antioxidants, such as sterically hindered phenols, processing stabilizers, such as phosphites or phosphonites, acid scavengers, such as calcium stearate or zinc stearate or dihydrotalcite, sterically hindered amines, or also UV stabilizers. The propylene polymers (A) or ethylene polymers (B) to be used according to the invention generally comprise amounts of up to 2% by weight of one or more of the stabilizers.

Examples of suitable lubricants and mold-release agents are fatty acids, the calcium or zinc salts of fatty acids, fatty amides and low-molecular-weight polyolefin waxes, usually used in concentrations of up to 2% by weight.

Examples of fillers for the propylene polymers (A) or ethylene polymers (B) to be used according to the invention are chalk or glass fibers in amounts of up to 50% by weight.

Examples of suitable nucleating agents are inorganic additives, such as silica or kaolin, salts of mono- or polycarboxylic acids, such as sodium benzoate or aluminum tert-butylbenzoate, dibenzylidenesorbitol or its $C_1$–$C_8$-alkyl-substituted derivatives, such as methyl- or dimethyldibenzylidenesorbitol, or salts of diesters of phosphoric acid, such as sodium 2,2'-methylenebis-(4,6-di-tert-butylphenyl)phosphate. The content of nucleating agents in the polymers (A) or (B) is generally up to 1% by weight.

Additives of this type are generally commercially available and are described, for example, in Gächter/Müller, Plastics Additives Handbook, 4th Edition, Hansa Publishers, Munich, 1993.

The novel polypropylene molding composition also comprises talc (C) whose average particle size determined by the Sedigraph method (Sedigraph D 5100) is from 1.0 to 10 $\mu$m, in particular from 1.0 to 4.0 $\mu$m. A talc of this type can be purchased commercially.

The novel talc-reinforced polypropylene molding composition is preferably prepared by mixing the individual components, i.e. the propylene polymer (A), the ethylene polymer (B) and the talc (C) in the apparatuses usually used for mixing substances in plastics processing, for example in turbulence mixers or drum mixers, in mills, in screw extruders or Discpack plasticators, or on roll mills or in kneaders.

In a particularly preferred process the novel talc-reinforced polypropylene molding composition is prepared by mixing the propylene polymer (A), the ethylene polymer (B) and the talc (C) together in a mixing apparatus, where the characterizing feature is that the three components (A), (B) and (C) are mixed in an extruder, in particular in a twin-screw extruder at from 180 to 280° C., in particular from 180 to 270° C. The mixing procedure is particularly preferably carried out at from 180 to 240° C.

The process for preparing the novel talc-reinforced polypropylene molding composition may also be carried out in the presence of a peroxide, in particular of an organic peroxide. Adding a peroxide of this type allows the melt flow rate of the novel talc-reinforced polypropylene molding composition to be adjusted to a desired value during the extrusion procedure. The propylene polymer (A) or ethylene polymer (B) used initially may also have a lower melt flow rate than is intended for the novel polypropylene molding composition and the rate may then be adjusted to a desired value by controlled use of organic peroxides.

Examples of organic peroxides suitable for this purpose are di-tert-butyl peroxide, tert-butyl hydroperoxide, tert-butyl perbenzoate, dilauroyl peroxide, peroxybenzoic acid, methyl isobutyl ketone peroxide, di-2-ethylhexyl peroxydicarbonate, dicyclohexyl peroxydicarbonate, dicetyl peroxydicarbonate, cumyl perneodecanoate, tert-amyl perpivalate, tert-butyl perneodecanoate, tert-butyl permaleate, tert-butyl perpivalate, and also tert-butyl perisononoate. Particular preference is given here to di-tert-butyl peroxide.

Based on the total of the components (A), (B) and (C) used, the amounts used of the organic peroxides are preferably from 0.01 to 0.1% by weight, in particular from 0.02 to 0.08% by weight.

The novel talc-reinforced molding composition features, inter alia, very high flowability with a very good stiffness/toughness ratio, and also good impact strength at low temperatures and markedly improved ultimate elongation. The preparation process, which is also novel, is technically simple to carry out and very cost-effective. Unlike with previously known blends made from polypropylene with ethylene-propylene rubbers, the melt flow rate can be adjusted by adding organic peroxides without impairing the low-temperature impact strength.

The novel talc-reinforced molding composition is suitable for producing films, fibers or moldings, in particular for producing moldings in the automotive sector, for example bumpers or dashboards.

EXAMPLES

All of the examples and comparative examples below used a Werner & Pfleiderer twin-screw extruder with a diameter of 53 mm at an average rotation rate of 200 rpm and with a temperature profile of from 180 to 230° C. to prepare the respective polypropylene molding compositions. In each case 0.05% by weight of Irganox® 1010, 0.1% by weight of Irgafos® 168, 0.2% by weight of Acrawax® C, 0.1% by weight of calcium stearate and 1% by weight of Elftex® 570 carbon black, based on 100% by weight, were admixed with the blend produced, for stabilization and processing purposes. In Example 5 and in Comparative Example C Trigonox® B was also used to improve control of the melt flow rate.

Irganox® 1010 from Ciba-Geigy is pentaerythritol tetrakis[3-(3,5-bis(1,1-dimethylethyl)-4-hydroxyphenyl) propionate] and Irgafos® 168, also from Ciba-Geigy, is tris(2,4-bis-tert-butylphenyl)phosphite. Acrawax® C is an N,N'-ethylenebisstearylamide. Elftex® 570 is a furnace black, and Trigonox® B is di-tert-butyl peroxide.

Example 1

64% by weight of a propylene block copolymer (A) made from 88% by weight of a propylene homopolymer and 12% by weight of a propylene-ethylene-copolymer (I) with an ethylene content, based on (I), of 45% by weight and a total ethylene content, based on the propylene block copolymer (A), of 7.0% by weight, and a melt flow rate of 40 g/10 min at 230° C. and 2.16 kg in accordance with ISO 1133 were extruded with 25% by weight of an ethylene-1-octene copolymer (B) and 11% by weight of a talc (C) in the twin-screw extruder. The ethylene-1-octene copolymer (B) had a 1-octene content of 24% by weight, a melt flow rate of 1.0 g/10 min at 190° C. and 2.16 kg in accordance with ISO 1133, a density of 0.870 g/cm$^3$, and a Mooney viscosity (ML 1+4; 121° C.) of 23 in accordance with DIN 53523/T1. The talc used (C) had an average particle size of 2.2 $\mu$m (by Sedigraph D 5100).

The melt flow rate, volume flow rate, tensile modulus of elasticity (stiffness), ultimate elongation and notched impact strength of the resultant talc-reinforced polypropylene molding composition were tested, and electronic penetration tests (dart impact test) were also carried out. The results obtained are given in the table below.

Example 2

Inventive Example 1 was repeated but using an ethylene-1-octene copolymer (B) with a 1-octene content of 25% by weight, a melt flow rate of 1.0 g/10 min at 190° C. and under 2.16 kg, in accordance with ISO 1133, a density of 0.859 g/10 min, and a Mooney viscosity (ML 1+4; 121° C.) of 20 in accordance with DIN 53523/T1.

The test results for the polypropylene molding composition obtained from inventive Example 2 are given in the table below.

Example 3

Inventive Example 1 was repeated but using an ethylene-1-octene copolymer (B) with a proportion of 25% by weight of 1-octene, a melt flow rate of 0.5 g/10 min at 190° C. and under 2.16 kg in accordance with ISO 1133, a density of 0.868 g/cm$^3$ and a Mooney viscosity (ML 1+4; 121° C.) of 35 in accordance with DIN 53523/T1.

The test results for the polypropylene molding composition obtained in inventive Example 3 are given in the table below.

Example 4

59% by weight of the propylene block copolymer (A) used in Example 1 were mixed with 20% by weight of the ethylene-1-octene copolymer (B) used in Example 2 and with 21% by weight of the talc (C) used in Example 1 under conditions similar to those used in Example 1.

The test results for the polypropylene molding composition obtained in inventive Example 4 are given in the table below.

Example 5

Inventive Example 1 was repeated, but instead of the propylene block copolymer (A) used with a melt flow rate of 40 g/10 min at 230° C. and under 2.16 kg in accordance with ISO 1133, use was made of a propylene block copolymer (A) of the same composition but with a melt flow rate of 4.0 g/10 min at 230° C. and under 2.16 kg in accordance with ISO 1133. The melt flow rate of the propylene block copolymer (A) was adjusted to about 40 g/10 min at 230° C. and under 2.16 kg in accordance with ISO 1133 by adding, during the extrusion, 0.06% by weight of Trigonox® B, based on the three components (A), (B) and (C). The resultant novel polypropylene molding composition had a melt flow rate of about 16 g/10 min at 230° C. and under 2.16 kg in accordance with ISO 1133.

The test results for the polypropylene molding composition obtained in inventive Example 5 are given in the table below.

Comparative Example A

Inventive Example 1 was repeated, but instead of 25% by weight of an ethylene-1-octene copolymer (B) use was now made of 25% by weight of a rubber batch. This rubber batch comprised 65% by weight of an ethylene-propylene copolymer with a propylene content of 41% by weight, a density of 0.865 g/cm$^3$ and a Mooney viscosity (ML 1+4; 100° C.) of 43 in accordance with DIN 53523/T1, 25% by weight of a propylene block copolymer with a total ethylene content of 10% and a melt flow rate of 6 g/10 min at 230° C. and under 2.16 kg in accordance with ISO 1133, and 10% by weight of polyethylene (HDPE) with a melt flow rate of 8 g/10 min at 190° C. and under 2.16 kg in accordance with ISO 1133.

The test results for the polypropylene molding composition obtained in this Comparative Example A are given in the table below.

Comparative Example B

Inventive Example 1 was repeated, but instead of 25% by weight of an ethylene-1-octene copolymer (B) use was now made of 25% by weight of an ethylene-propylene rubber with a propylene content of 24% by weight, a Mooney viscosity (ML 1+4; 121° C.) of 30 in accordance with DIN 53523/T1 and a melt flow rate of 7.0 g/10 min at 230° C. and under 5.0 kg in accordance with ISO 1133.

The test results for the polypropylene molding composition obtained in this Comparative Example B are given in the table below.

Comparative Example C

Comparative Example A was repeated, but instead of the propylene block copolymer (A) used with a melt flow rate of 40 g/10 min at 230° C. and under 2.16 kg in accordance with ISO 1133 use was made of a propylene block copolymer (A) of the same composition but with a melt flow rate of 4.0 g/10 min at 230° C. and under 2.16 kg in accordance with ISO 1133. The melt flow rate of the propylene block copolymer was adjusted to about 40 g/10 min at 230° C. and under 2.16 kg in accordance with ISO 1133 by adding, during the extrusion, 0.06% by weight of Trigonox® B, based on the three components (A), (B) and (C). The melt flow rate of the resultant polypropylene molding composition in accordance with ISO 1133 was about 17 g/10 min at 230° C. and under 2.16 kg.

The test results for the polypropylene molding composition obtained in this Comparative Example C are given in the table below.

TABLE

| Test method | In accordance with | | Ex. 1 | Ex. 2 | Ex. 3 | Ex. 4 | Ex. 5 | Comp. Ex. A | Comp. Ex. B | Comp. Ex. C |
|---|---|---|---|---|---|---|---|---|---|---|
| Melt flow rate [MFR] 230/2.16 | ISO 1133 | g/10 min | 15 | 16 | 14 | 18 | 16 | 17 | 6 | 17 |
| Volume flow rate [MVR] 230/2.16 | ISO 1133 | cm$^3$/10 min | 18 | 20 | 17 | 21 | 19 | 20 | 7 | 20 |
| Tensile modulus of elasticity | ISO 527/1 + 2 | MPa | 1150 | 1100 | 1200 | 1510 | 1100 | 1200 | 950 | 1100 |

TABLE-continued

| Test method | In accordance with | | Ex. 1 | Ex. 2 | Ex. 3 | Ex. 4 | Ex. 5 | Comp. Ex. A | Comp. Ex. B | Comp. Ex. C |
|---|---|---|---|---|---|---|---|---|---|---|
| Ultimate elongation | ISO 527/1 + 2 | % | 350 | 360 | 320 | 104 | 330 | 42 | 250 | 40 |
| Charpy notched impact strength | | | | | | | | | | |
| 23° C. | ISO 179/1eA | $kJ/m^2$ | 79 | 76 | 77 | 47 | 75 | 47 | 70 | 45 |
| 0° C. | ISO 179/1eA | $kJ/m^2$ | 62 | 59 | 60 | 20 | 65 | 11 | 50 | 9 |
| −20° C. | ISO 179/1eA | $kJ/m^2$ | 14 | 15 | 12 | 7 | 12 | 7 | 15 | 5 |
| −30° C. | ISO 179/1eA | $kJ/m^2$ | 9 | 9 | 9 | 5 | 10 | 6 | 8 | 4 |
| Electronic penetration test −20° C. | ISO 6603/2 | Nature of fracture | ductile | ductile | ductile | ductile | ductile | ductile/brittle | ductile | ductile/brittle |
| Electronic penetration test −30° C. | ISO 6603/2 | Nature of fracture | ductile | ductile | ductile | ductile/brittle | ductile | brittle | ductile | ductile |
| Electronic penetration test −40° C. | ISO 6603/2 | Nature of fracture | ductile/brittle | ductile/brittle | ductile/brittle | brittle | ductile/brittle | brittle | ductile/brittle | brittle |
| Density | ISO 1183 | $g/cm^3$ | 0.97 | 0.97 | 0.97 | 1.04 | 0.97 | 0.97 | 0.97 | 0.97 |

The table shows, inter alia, that, compared with the polypropylene molding compositions of Comparative Examples A to C, the novel polypropylene molding compositions have the same density, comparable flowability and stiffness (tensile modulus of elasticity) but, inter alia, markedly improved ultimate elongation, improved notched impact strength, especially at low temperatures, and improved performance in the electronic penetration test (dart impact test), particularly at low temperatures. This property profile makes the novel polypropylene molding compositions particularly useful for thin-walled bumpers.

We claim:

1. A process for preparing a talc-reinforced polypropylene molding composition comprising
   a) from 35 to 90% by weight of a propylene polymer (A) with a melt flow rate of from 15 to 100 g/10 min at 230° C. and under a load of 2.16 kg in accordance with ISO 1133 and a content of from 0 to 25% by weight of other $C_2$–$C_{10}$-1-alkenes,
   b) from 5 to 40% by weight of an ethylene polymer (B) with from 20 to 30% by weight of copolymerized $C_4$–$C_{10}$-1-alkenes, a melt flow rate of from 0.2 to 30 g/10 min at 190° C. and under a load of 2.16 kg in accordance with ISO 1133, a density of from 0.850 to 0.880 $g/cm^3$ and a Mooney viscosity (MS 1+4; 121° C.) of from 5 to 50 in accordance with DIN 53523/T1, and
   c) from 5 to 25% by weight of talc whose average particle size by the Sedigraph method is from 1.0 to 10 µm, wherein the propylene polymer (A), the ethylene polymer (B) and the talc (C) are mixed with one another in a mixing apparatus, which comprises mixing the three components (A), (B) and (C) in a twin-screw extruder at from 180 to 280° C., and wherein the three components (A), (B) and (C) are mixed in the presence of an organic peroxide.

2. The process of claim 1, where the other $C_2$–$C_{10}$-1-alkene used in the propylene polymer (A) comprises ethylene.

3. The process of claim 1, where the propylene polymer (A) has a melt flow rate of from 30 to 60 g/10 min at 230° C. and under a load of 2.16 kg in accordance with ISO 1133 and a content of 5 to 10% by weight of other $C_2$–$C_{10}$-1-alkenes.

4. The process of claim 1, where the copolymerized $C_4$–$C_{10}$-1-alkene used in the ethylene polymer (B) comprises 1-octene.

5. The process of claim 1, where the ethylene polymer (B) has from 23 to 26% by weight of copolymerized $C_4$–$C_{10}$-1-alkenes, a melt flow rate of from 0.5 to 5 g/10 min at 190° C. and under a load of 2.16 kg in accordance with ISO 1133, a density of from 0.855 to 0.870 $g/cm^3$ and a Mooney viscosity (ML 1+4; 121° C.) of from 20 to 40 in accordance with DIN 53523/T1.

6. The process of claim 1, where the average particle size of the talc (C) by the Sedigraph method is from 1.0 to 4.0 µm.

7. The process of claim 1, comprising
   a) from 40 to 70% by weight of a propylene polymer (A),
   b) from 15 to 35% by weight of an ethylene polymer (B), and
   c) from 10 to 25% by weight of talc (C).

* * * * *